United States Patent
Chapman

(10) Patent No.: US 8,517,357 B2
(45) Date of Patent: Aug. 27, 2013

(54) GAS SPRING AND DAMPER ASSEMBLY

(75) Inventor: Todd A. Chapman, Noblesville, IN (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 270 days.

(21) Appl. No.: 12/818,888

(22) Filed: Jun. 18, 2010

(65) Prior Publication Data

US 2010/0320657 A1 Dec. 23, 2010

Related U.S. Application Data

(60) Provisional application No. 61/218,655, filed on Jun. 19, 2009.

(51) Int. Cl.
*F16F 9/04* (2006.01)

(52) U.S. Cl.
USPC ............... 267/64.24; 267/64.21; 267/64.27

(58) Field of Classification Search
None
See application file for complete search history.

(56) References Cited

U.S. PATENT DOCUMENTS

| | | | | |
|---|---|---|---|---|
| 4,175,770 A | * | 11/1979 | Draisbach et al. | 280/124.155 |
| 4,462,608 A | * | 7/1984 | Lederman | 280/124.155 |
| 4,555,096 A | * | 11/1985 | Pryor | 267/64.21 |
| 4,648,623 A | * | 3/1987 | Cameron | 280/124.155 |
| 4,655,438 A | * | 4/1987 | Cameron | 267/220 |
| 4,697,797 A | * | 10/1987 | Gold | 267/64.24 |
| 4,738,437 A | * | 4/1988 | Paton et al. | 267/196 |
| 4,817,928 A | * | 4/1989 | Paton | 267/219 |
| 5,135,203 A | * | 8/1992 | Wijnhoven et al. | 267/64.21 |
| 5,667,203 A | * | 9/1997 | Romer | 267/64.23 |
| 6,089,552 A | * | 7/2000 | Pahl | 267/64.24 |
| 6,286,820 B1 | * | 9/2001 | Raulf et al. | 267/64.21 |
| 6,454,248 B2 | * | 9/2002 | Pradel | 267/64.24 |
| 6,742,775 B2 | * | 6/2004 | Oldenettel | 267/64.21 |
| 2002/0130452 A1 | * | 9/2002 | Behmenburg et al. | 267/64.23 |
| 2005/0212187 A1 | * | 9/2005 | Achenbach | 267/118 |
| 2011/0140323 A1 | * | 6/2011 | Kwon | 267/64.24 |

FOREIGN PATENT DOCUMENTS

| | | |
|---|---|---|
| DE | 103 02 495 A1 | 9/2003 |
| DE | 102 27 888 A1 | 1/2004 |
| EP | 0 639 473 A2 | 2/1995 |
| EP | 1 239 181 A2 | 9/2002 |
| EP | 1 261 813 B2 | 12/2002 |
| JP | 59212551 | 1/1984 |

OTHER PUBLICATIONS

Published English language Abstract for EP 1 261 813 B2.
Published English language Abstract for DE 103 02 495 A1.
Published English language Abstract for EP 0 639 473 A2.
Published English language Abstract for JP59212551.

* cited by examiner

*Primary Examiner* — Thomas Irvin
(74) *Attorney, Agent, or Firm* — Jason A. Houser; Fay Sharpe LLP

(57) ABSTRACT

A gas spring and damper assembly includes a damper and a gas spring. The damper includes a damper housing and a damper rod. The gas spring includes a first end member, a second end member and a flexible wall operatively connected therebetween. A friction-reducing element is operatively connected between the damper housing and the second end member. A sealing element is operatively disposed between the damper housing and the second end member such that a substantially fluid-tight seal is formed therebetween.

19 Claims, 3 Drawing Sheets

GAS SPRING AND DAMPER ASSEMBLY

This application claims the benefit of U.S. Provisional Patent Application No. 61/218,655, filed on Jun. 19, 2009, the entire contents of which is hereby incorporated herein by reference.

The subject matter of the present disclosure broadly relates to the art of spring devices and, more particularly, to a gas spring and gas damper assembly that is capable of eliminating suspension-induced twist in the gas spring thereof.

BACKGROUND

Suspension systems of a wide variety of types and kinds are generally well known and are provided to permit relative movement between the sprung and unsprung masses of a vehicle. In some cases, such relative movement may impart a relative rotation to the opposing end members of a gas spring assembly. Such condition often occurs in gas spring and damper assemblies in which a pressurized gas spring is assembled outwardly along an otherwise conventional damper. Such relative rotation is generally deemed undesirable as the same induces a twist in the flexible wall of the gas spring assembly, which can lead to performance degradation and/or other issues.

Various designs have been developed in an effort to eliminate the occurrence of such rotation-induced twisting of the flexible wall. As one example, the upper end member of the gas spring can be secured on the sprung mass of a vehicle in a manner capable of permitting rotation rather than by rigidly securing the upper end member to the unsprung mass of the vehicle. One disadvantage of such arrangements, however, is that additional clearance and/or mounting features are often required on or along the vehicle to accommodate such a mounting arrangement.

As another example, the second or lower end member of the gas spring can be rotatable supported on the upper end of the housing of the damper, such as by using a friction-reducing bearing, for example. In known designs, however, the sealing arrangement between the lower end member and the damper housing is provided in spaced relation to the rotational support area. As such, lateral movement of the second end member at or along the sealing arrangement can undesirably occur and may result in the loss of pressurized gas from the spring chamber of the gas spring. Additionally, such arrangements are often incapable of fully utilizing a volume disposed between the damper housing and the second end member as an operative portion of the spring chamber. This is due, at least in part, to the positioning and interconnection of the friction-reducing bearing between the second end member and the damper housing.

As such, it is believed desirable to develop a gas spring and gas damper assembly that overcomes the foregoing and/or other disadvantages.

BRIEF SUMMARY

One example of a gas spring and damper assembly in accordance with the subject matter of the present disclosure can include a damper, a gas spring, a friction-reducing element and a sealing element. The damper can include a damper housing and a damper rod that is operatively connected with the damper housing for relative reciprocal motion therebetween. The gas spring can include a first end member, a second end member and a flexible wall. The first end member can be supported on the damper rod. The second end member can be disposed in longitudinally-spaced relation to the first end member and can extend longitudinally along at least a portion of the damper housing. The second end member can include a side wall extending longitudinally between opposing first and second ends. The side wall can include a first wall portion that has a first cross-sectional dimension and is disposed toward the first end. A second wall portion can have a second cross-sectional dimension that is less than the first cross-sectional dimension and can be disposed toward the second end. A third wall portion can have a third cross-sectional dimension that is less than the first and second cross-sectional dimensions and can be disposed between the first and second wall portions. The first wall portion can be spaced radially-outwardly from the damper housing such that the first end is unsupported by the damper housing and such that a fixed volume is defined between the damper housing and at least the first wall portion with an opening formed between the damper housing and the first wall portion of the side wall along the first end. The flexible wall can be secured between the first and second end members such that a spring chamber is at least partially defined therebetween. The spring chamber being operative to receive a quantity of pressurized gas. The spring chamber can include a first volume that is at least partially defined by the first end member and the flexible wall, and the fixed volume that is at least partially defined between the damper housing and at least the first wall portion of the side wall. The first volume and the fixed volume can be in fluid communication through the opening such that a portion of the quantity of pressurized gas is disposed within each of the first volume and the fixed volume. The friction-reducing element can be operatively connected between the damper housing and the second wall portion of the side wall of the second end member such that the damper housing and the second end member are freely rotatable relative to one another. The sealing element can be operatively disposed between the damper housing and the second end member such that a substantially fluid-tight seal is formed therebetween. The sealing element can be substantially fixedly supported on one of the damper housing and the third wall portion and can interface with the other of the damper housing and the third wall portion for relative rotational movement therebetween. The sealing member can be positioned longitudinally-inwardly from the friction-reducing element such that the sealing element is longitudinally supported by at least a portion of the friction-reducing element and such that the quantity of pressurized gas within the fixed volume can act to urge the sealing element toward the friction-reducing element.

Another example of a gas spring and damper assembly in accordance with the subject matter of the present disclosure can include a damper, a gas spring, a friction-reducing element and a sealing element. The damper can include a damper housing and a damper rod that is operatively connected with the damper housing for relative reciprocal motion therebetween. The gas spring can include a first end member that is supported along the damper rod. A second end member can be disposed in longitudinally-spaced relation to the first end member and can extend longitudinally along at least a portion of the damper housing. The second end member can include a side wall that extends longitudinally between opposing first and second ends. The side wall can include a first section that is disposed toward the first end and a second section disposed toward the second end. The first section can be spaced radially-outwardly from the damper housing such that the first end is unsupported by the damper housing and such that a fixed volume is defined between the damper housing and the side wall with an opening formed between the damper housing and the side wall along the first end. A flexible wall can be secured between the first and second end members such that a spring chamber is at least partially defined therebetween that is operative to receive a quantity of pressurized gas. The spring chamber can include a first volume defined at least in part by the first end member and the flexible wall, and the spring chamber can also include the fixed volume. In such case, the first volume and the fixed volume can be in open and substantially-complete fluid communication through the opening. The friction-reducing element can be operatively connected between the damper housing and the second section of the side wall of the second end member such that the damper housing and the second end member are freely rotatable relative to one another. The sealing element can be operatively disposed between the damper housing and the second section of the side wall such that a substantially fluid-tight seal is formed therebetween. The sealing member can be positioned longitudinally-inwardly from the friction-reducing element such that the sealing element is longitudinally supported by at least a portion of the friction-reducing element and such that the quantity of pressurized gas within the spring chamber acts to urge the sealing element toward the friction-reducing element.

DETAILED DESCRIPTION

Figure 1:
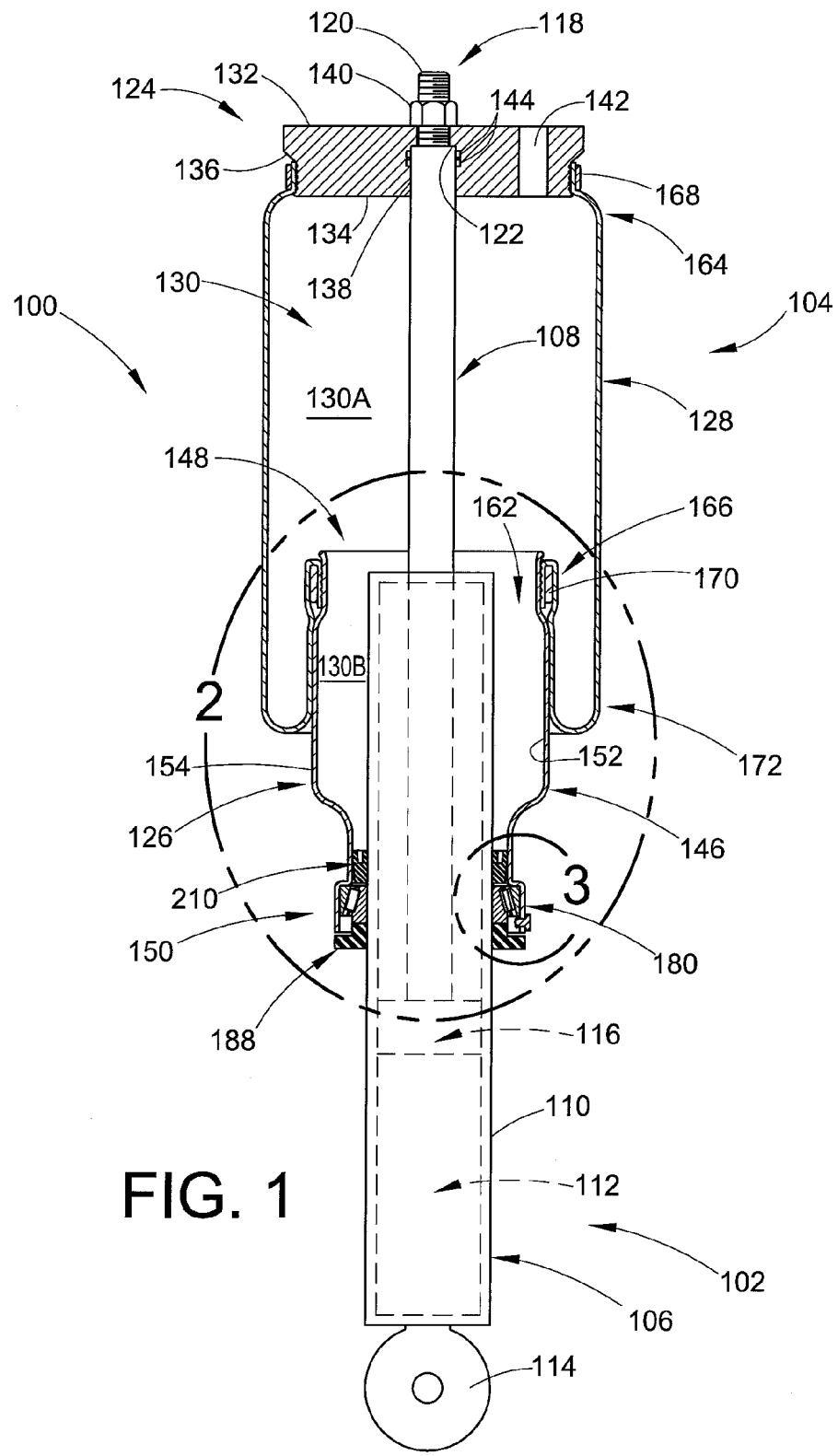
FIG. 1 is a side elevation view, in partial cross section, of one example of a gas spring and damper assembly in accordance with the subject matter of the present disclosure.

Turning now to the drawings, wherein the showings are for the purpose of illustrating examples of the subject matter of the present disclosure and which are not intended to be limiting, FIG. 1 illustrates a gas spring and damper assembly 100 in accordance with the subject matter of the present disclosure. Gas spring and damper assembly 100 is shown as including a damper, which is generally identified in FIG. 1 by item number 102, and a gas spring, which is generally identified in FIG. 1 by item number 104. Damper 102 and gas spring 104 can be operatively connected with one another in any suitable manner capable of permitting an end member of the gas spring to be rotatably supported on the damper. Additionally, it will be appreciated that the damper and the gas spring can be of any suitable type, kind, configuration and/or construction.

In the exemplary arrangement shown in FIG. 1, damper 102 includes a damper housing 106 and a damper rod 108 that is operatively connected with the damper housing and is capable of undergoing relative reciprocal motion with respect thereto in a conventional manner. Damper housing 106 is shown in FIG. 1 as including a housing wall 110 that at least partially defines a damping chamber 112. Additionally, damper housing 106 includes a housing securement feature 114 that is suitable for operatively connecting damper housing 106 to an associated structural component, such as a sprung or unsprung mass of a vehicle (not shown), for example.

Damper rod 108 includes a rod end 116 received in damping chamber 112 of damper housing 106. It will be appreciated that rod end 116 can include any one or more features and/or components that may be suitable for providing any desired damping characteristics and/or properties, such as may be known in the art. Damper rod 108 includes an opposing rod end 118 that can be operatively connected to an associated structural component such as a sprung or unsprung mass of a vehicle (not shown), for example, either directly or by way of one or more other components and/or features. As shown in the exemplary embodiment in FIG. 1, rod end 118 includes a rod securement feature, such as a plurality of threads 120 extending longitudinally there along and an optional shoulder 122 disposed longitudinally-inwardly therefrom.

It will be appreciated that damper 102, which is shown in FIG. 1 as a conventional strut-style damper, can be of any suitable type, kind, configuration and/or construction, and that the embodiment of damper 102 shown in FIG. 1 is merely exemplary and is not intended to be limiting.

Gas spring 104 includes an end member 124 that is supported on or along damper rod 108, end member 126 that is supported on damper housing 102 in spaced relation to an end member 124, and a flexible wall 128 that is secured between the end members and at least partially defines a spring chamber 130 that includes a primary or variable volume portion 130A.

End member 124 can be of any suitable type, kind, configuration and/or construction, such as a top cap or bead plate, for example. End member 124 is shown in FIG. 1 as including an end wall 132 and an end wall 134 that is spaced from wall 132. A side wall 136 extends longitudinally between the end walls. End member 124 can operatively engage damper rod 108 in any suitable manner. As one example, end member 124 can include a mounting passage 138 that extends through end member 124. The mounting passage can receive rod end 118, such as, for example, by abuttingly engaging shoulder 122 formed thereon. End member 124 and damper rod 108 can be operatively secured together in any suitable manner, such as through the use of a threaded nut 140 operatively interengaging a plurality of threads disposed along rod end 118, for example.

Additionally, a suitable pressurized gas source (not shown) can be in fluid communication with spring chamber 130 in any suitable manner. As one example, a fluid passage 142 can extend through end member 124 in fluid communication with spring chamber 130. It will be appreciated, however, that any other suitable arrangement and/or features or combination of features can alternately be used. Preferably, a substantially fluid-tight seal is formed between end member 124 and rod end 118, such as by providing one or more sealing elements 144 positioned therebetween, for example.

End member 126 can be of any suitable type, kind, configuration and/or construction and can be formed from any suitable material or combination of materials. In the exemplary embodiment shown in FIGS. 1-3, end member 126 includes a side wall 146 that extends longitudinally between opposing ends 148 and 150. Side wall 146 also includes an inner surface 152 and an opposing outer surface 154. Additionally, it will be appreciated that side wall 146 can be formed from any suitable material or combination of materials, such as metal (e.g., steel or aluminum), plastics (e.g., fiber-reinforced polyamides), or any combination thereof. Furthermore, side wall 146 can be of any suitable form and/or configuration, such as including one or more walls and one or more connecting or support walls, for example. In the exemplary arrangement shown in FIGS. 1-3, side wall 146 has a relatively thin cross-sectional thickness, such as within a range of from about 0.025 inches to approximately 0.250 inches, for example.

Figure 2:
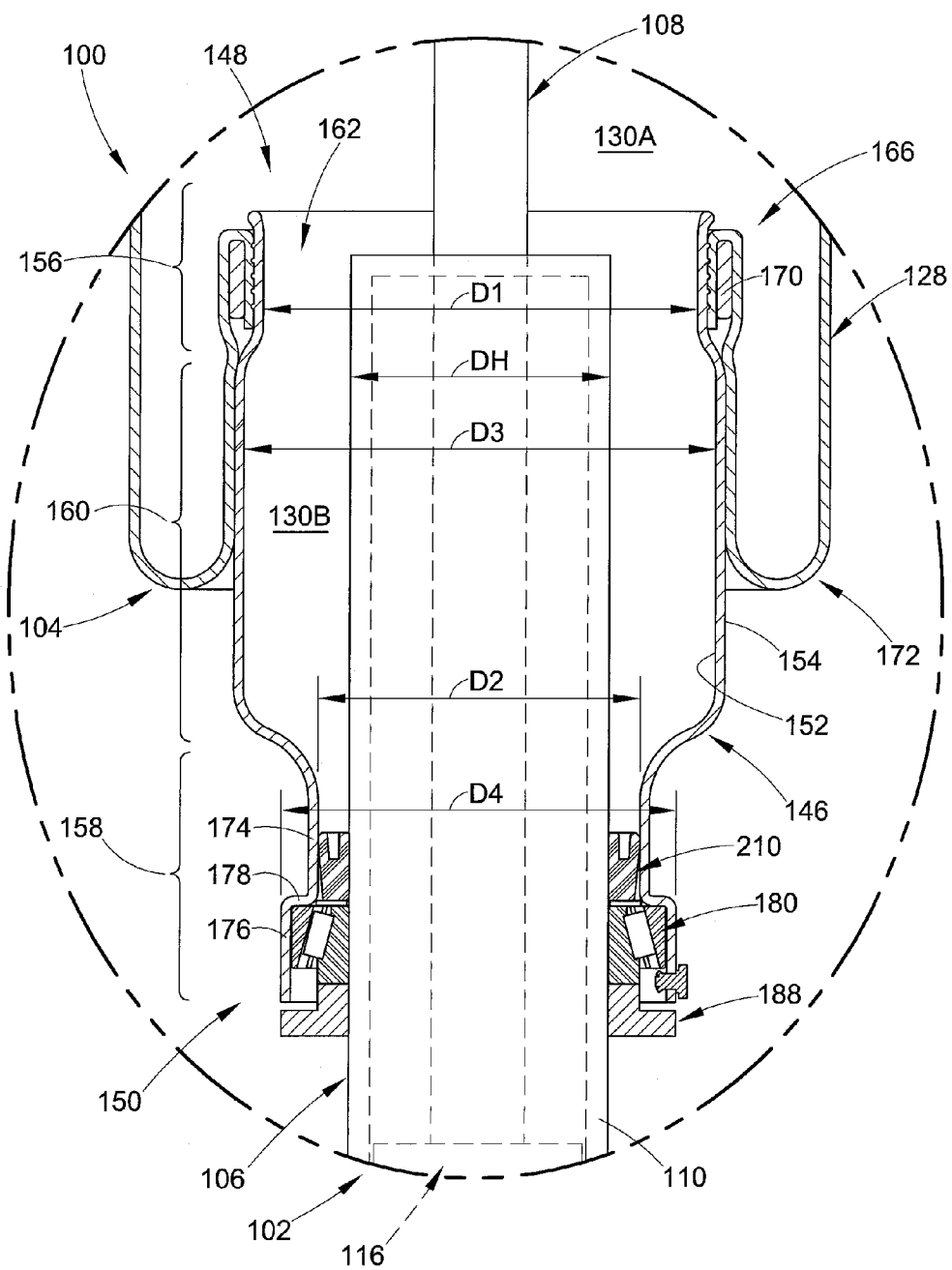
FIG. 2 is an enlarged cross-sectional side view of the portion of the gas spring and damper assembly identified as Detail 2 in FIG. 1.

As is identified in FIG. 2, side wall 146 includes a plurality of longitudinal wall sections, such as a longitudinal wall section 156 (which may alternately be referred to herein as a wall portion) disposed toward end 148, a longitudinal wall section 158 (which may alternately be referred to herein as a wall portion) disposed toward end 150, and a longitudinal wall section 160 (which may alternately be referred to herein as a wall portion) disposed between longitudinal wall sections 156 and 158.

Longitudinal wall section 156 is shown as having a cross-sectional dimension D1 that is substantially greater than an outer cross-sectional dimension DH of the damper housing such that longitudinal wall section 156 is disposed in radially-outwardly spaced relation to the damper housing and an opening 162 is formed therebetween. It will be recognized from the exemplary arrangement shown in FIGS. 1 and 2 that end 148 is a free end of the second end member that is unsupported by damper housing 106.

While it will be recognized that other arrangements and/or configurations could alternately be used, longitudinal wall section 158 has a cross-sectional dimension D2 that is shown as being less than cross-sectional dimension D1 of longitudinal wall section 156. Longitudinal wall section 160 extends generally longitudinally between wall sections 156 and 158. Again, while it will be recognized that other arrangements and/or configurations could alternately be used, wall section 160 has a cross-sectional dimension D3 that is shown as being greater than cross-sectional dimensions D1 and D2. Wall sections 156 and 160 of side wall 146 at least partially define a fixed volume or portion 130B of spring chamber 130. It will be appreciated that portions 130A and 130B are in fluid communication with one another through opening 162 formed between end 148 of end member 126 and damper housing 106.

Flexible wall 128 extends between opposing ends 164 and 166. End 164 can be sealingly connected to end member 124 in any suitable manner, such as by securing a portion of end 164 along side wall 136 using a retaining ring 168, for example. Similarly, end 166 can be operatively connected to end member 126 in any suitable manner, such as by securing a portion of end 166 along wall section 158 of side wall 146 using a retaining ring 170, for example. As discussed above, flexible wall 128 can be of any suitable type, kind, configuration and/or construction. As shown in the exemplary arrangement in FIGS. 1 and 2, flexible wall 128 forms a rolling lobe 172 that rolls along outer surface 154 of side wall 146 in a conventional manner.

Wall section 158 of side wall 146 is shown including a wall portion 174 having approximately cross-sectional dimension D2. Wall section 158 can also include a wall portion 176 that is disposed radially outwardly from wall portion 174. As such, wall portion 176 can have a cross-sectional dimension D4 that is greater than cross-sectional dimension D2, though it will be recognized that another arrangement or configuration could alternately be used. A wall portion 178 extends radially between wall portions 174 and 176 to at least partially define a shoulder that extends approximately transverse (e.g., perpendicular) to wall portions 174 and 176.

End member 126 is supported on damper housing 106 such that the end member is capable of relative rotational movement with respect to the damper housing. It will be appreciated that such relative rotational movement can be provided in any suitable manner. In the exemplary arrangement shown in FIGS. 1 and 2, a friction-reducing element 180 is disposed between damper housing 106 and end member 126. It will be appreciated that friction-reducing element 180 can be of any suitable type, kind, configuration and/or construction. As one example, a plain bearing, such as a polymeric or oil-impregnated bronze sleeve, for example, could be used. Additionally, or in the alternative, a rotational bearing assembly could be provided and operatively secured between the damper housing and the second end member. Such a rotational bearing assembly can be of any suitable type, kind, configuration and/or construction.

Figure 3:
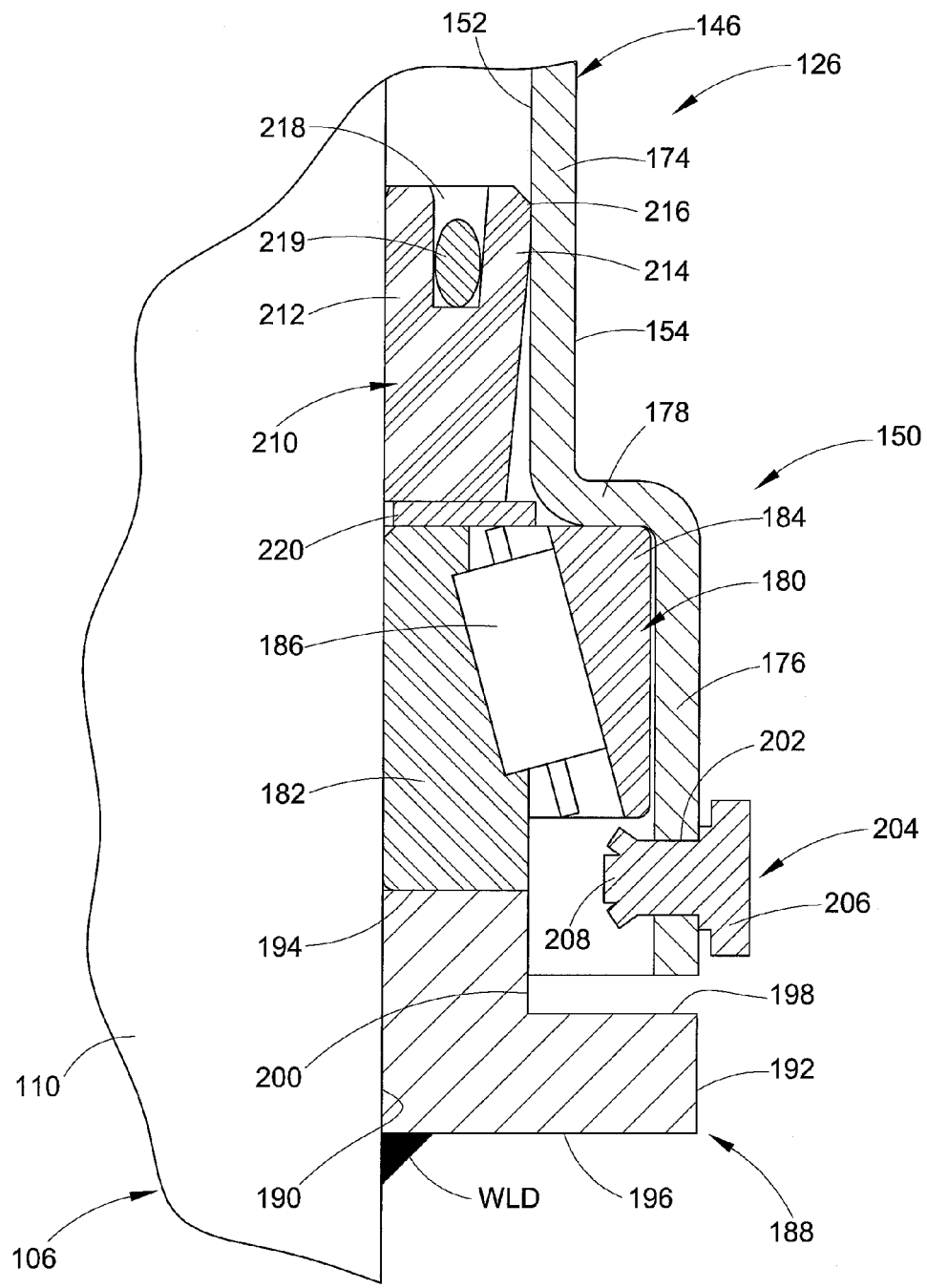
FIG. 3 is a further enlarged cross-sectional side view of the portion of the gas spring and damper assembly identified as Detail 3 in FIG. 1.

Regardless of the type or kind of friction-reducing element that is used, it will be recognized that the same will be subjected to axially-applied forces associated with the normal operation and use of gas spring and damper assembly 100. As such, a friction-reducing element capable of withstanding such forces is preferred. One example of a rotational bearing assembly capable of such use is a conventional angular-contact ball bearing assembly. Another example of a rotational bearing assembly capable of such use is shown in FIGS. 1-3 as being a conventional tapered roller bearing assembly. In the exemplary arrangement shown, friction-reducing element 180 includes a bearing component 182 (FIG. 3) that is supported on or along damper housing 106, such as, for example, an inner race or roller bearing cone of a tapered roller bearing assembly. Friction-reducing element 180 also includes a bearing component 184 (FIG. 3), such as, for example, an outer race or cup of the roller bearing assembly that operatively engages bearing component 182 and is rotatable relative thereto. Additionally, a plurality of rollers 186 (FIG. 3) or other bearing elements are operatively disposed between bearing components 182 and 184.

Friction-reducing element 180 can be operatively supported between damper housing 106 and end member 126 of gas spring 104 in any suitable manner. For example, bearing component 182 can be press fit on or along the damper housing. Additionally, or in the alternative, a bearing seat 188 can be affixed on or along damper housing 106, such as by using a flowed-material joint WLD (FIG. 3), for example. As is more clearly identified in FIG. 3, bearing seat 188 can include a side wall 190 disposed adjacent damper housing 106 and a side wall 192 forming an outermost extent of the bearing seat. An end wall 194 is disposed toward friction-reducing element 180 and an end wall 196 is spaced therefrom. Optionally, an end wall 198 and a side wall 200 can at least partially define a shoulder (not numbered) along bearing seat 188. While bearing seat 188 is shown and described herein as being formed from a single component extending circumferentially about damper housing 106, it will be appreciated that two or more bearing seat portions extending partially around the damper housing could alternately be used. In the exemplary embodiment shown in FIGS. 1-3, bearing seat 188 is secured along damper housing 106 and bearing component 182 is axially supported in abutting engagement along end wall 194 thereof.

Friction-reducing element 180 can operatively engage or be otherwise retained on end member 126 in any suitable manner. For example, bearing component 184 could be press fit into end 150 of side wall 146. As a more specific example, bearing component 184 could be press fit or otherwise received in and along wall portion 176 of wall section 158 such that bearing component 184 is in abutting engagement with the shoulder at least partially defined by wall portion 178. Wall portion 176 can optionally include one or more openings 202 formed therethrough that receive suitable retaining elements, which may assist in maintaining bearing component 184 within end 150 of side wall 146. In the exemplary embodiment shown, a retaining pin 204 extends through opening 202. It will be appreciated that a retaining pin of any suitable type, kind and/or configuration could be used. In the arrangement shown, retaining pin 204 has a head 206 disposed outwardly of side wall 146 and an expandable free end 208 disposed inwardly of the side wall and is dimensioned to engage bearing component 184.

As discussed above, portion 130B of spring chamber 130 is in open and substantially-complete fluid communication with portion 130A of the spring chamber. As such, one or more sealing elements are preferably provided between damper housing 106 and end member 126 to thereby form a substantially fluid-tight seal therebetween. It will be appreciated that any number of one or more sealing elements of any suitable type, kind, configuration and/or construction can be used.

One example of a suitable sealing member is identified in FIGS. 1-3 as sealing element 210. As illustrated in FIG. 3, sealing element 210 can be a U-shaped lip seal that includes an inner wall 212 disposed along housing wall 110 of damper housing 106. Sealing element 210 also includes an outer wall 214 and a lip portion 216 that abuttingly engages inside surface 152 of side wall 146. Optionally, inner and outer walls 212 and 214 can at least partially define an open end 218 of sealing element 210. A spring element 219 can optionally be included as a component of sealing element 210, such as, for example, by being disposed within open end 218 and acting to bias the lip portion toward an associated sealing surface. Additionally, sealing element can be oriented with respect to damper housing 106 and end member 126 such that open end 218 is disposed toward and in fluid communication with spring chamber 130. In a preferred arrangement, sealing element 210 remains stationary with respect to the damper housing. In such an arrangement, a dynamic seal is maintained between lip portion 216 and inner surface 152 during relative rotation or other movement of end member 126 with respect to damper housing 106 and sealing element 210.

Additionally, sealing element 210 can be supported on or along damper housing 106 and/or second end member 126 in any suitable manner. For example, the sealing element could be supported directly on bearing component 182. As another example, sealing element 210 could be supported on bearing seat 188 and, thus, be fluidically disposed downstream of friction-reducing element 180. As a further alternative, a sealing member support element 220 can be disposed between bearing component 182 and sealing element 210 such that the sealing element is supported in spaced relation to the friction-reducing element. It will be appreciated that sealing member support element 220 can be of any suitable size, shape, configuration and/or construction. In the exemplary arrangement shown, support element 220 is substantially planar and includes opposing first and second sides that respectively abuttingly engage sealing element 210 and bearing component 182.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation.

Furthermore, the phrase "flowed-material joint" and the like are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment is specifically shown and described as including all such features and components. However, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations insofar as they come within the scope of the appended claims and any equivalents thereof.

The invention claimed is:

1. A gas spring and damper assembly comprising:
a damper including a damper housing and a damper rod operatively connected with said damper housing for relative reciprocal motion therebetween;
a gas spring including:
a first end member supported on said damper rod;
a second end member disposed in longitudinally-spaced relation to said first end member and extending longitudinally along at least a portion of said damper housing, said second end member including a side wall having an outer surface and extending longitudinally between opposing first and second ends, said side wall including a first wall portion having a first cross-sectional dimension and being disposed toward said first end, a second wall portion having a second cross-sectional dimension that is less than said first cross-sectional dimension and being disposed toward said second end, and a third wall portion having a third cross-sectional dimension that is less than said first and second cross-sectional dimensions and being disposed between said first and second wall portions, said first wall portion being spaced radially-outwardly from said damper housing such that said first end is unsupported by said damper housing and such that a fixed volume is defined between said damper housing and at least said first wall portion with an opening formed between said damper housing and said first wall portion of said side wall along said first end;
    a flexible wall forming a rolling lobe that rolls along said outer surface of said side wall and secured between said first and second end members such that a spring chamber is at least partially defined therebetween and operative to receive a quantity of pressurized gas, said spring chamber including a first volume at least partially defined by said first end member and said flexible wall and including said fixed volume at least partially defined between said damper housing and at least said first wall portion of said side wall, said first volume and said fixed volume being in fluid communication through said opening such that a portion of said quantity of pressurized gas is disposed within each of said first volume and said fixed volume;
    a friction-reducing element operatively connected between said damper housing and said second wall portion of said side wall of said second end member such that said damper housing and said second end member are freely rotatable relative to one another; and,
    a sealing element operatively disposed between said damper housing and said second end member such that a substantially fluid-tight seal is formed therebetween, said sealing element substantially fixedly supported on one of said damper housing and said third wall portion and interfacing with the other of said damper housing and said third wall portion for relative rotational movement therebetween, and said sealing member being positioned longitudinally-inwardly from said friction-reducing element such that said sealing element is longitudinally supported by at least a portion of said friction-reducing element and said quantity of pressurized gas within said fixed volume urges said sealing element toward said friction-reducing element.

2. A gas spring and damper assembly according to claim 1, wherein said friction-reducing element includes an inner bearing component, an outer bearing component and a plurality of rotating elements operatively connected therebetween.

3. A gas spring and damper assembly according to claim 2, wherein said damper housing includes a bearing seat fixedly attached thereto and said inner bearing component is supported on said damper housing in abutting engagement with said bearing seat.

4. A gas spring and damper assembly according to claim 3, wherein said bearing seat is fixedly attached to said damper housing by way of a flowed-material joint.

5. A gas spring and damper assembly according to claim 2, wherein said side wall of said second end member includes a shoulder extending between said second and third wall portions, and said outer bearing component is supported on said second wall portion of said side wall in abutting engagement with said shoulder.

6. A gas spring and damper assembly according to claim 2 further comprising a support element disposed between said friction-reducing element and said sealing element, said support element including a first surface abuttingly engaging said sealing element and an opposing second surface abuttingly engaging said inner bearing component.

7. A gas spring and damper assembly according to claim 1, wherein said side wall includes a fourth wall portion disposed between said first wall portion and said third wall portion, and said fourth wall portion having a fourth cross-sectional dimension that is greater than said first, second and third cross-sectional dimensions.

8. A gas spring and damper assembly according to claim 1, wherein said second wall portion of said side wall includes at least one opening extending therethrough.

9. A gas spring and damper assembly according to claim 8 further comprising a retaining element extending through said opening in said second wall portion, said retaining element being dimensioned to maintain said bearing element in operative association with said second wall portion of said side wall.

10. A gas spring and damper assembly according to claim 1, wherein said sealing element includes an inner side wall, an outer side wall and an open end at least partially defined by said inner and outer side walls, said sealing element oriented relative to said damper housing and said second end member such that said open end is in fluid communication with said quantity of pressurized gas in said fixed volume of said spring chamber.

11. A gas spring and damper assembly according to claim 10, wherein said outer side wall of said sealing element includes a lip portion that abuttingly engages said other of said damper housing and said third wall portion.

12. A gas spring and damper assembly according to claim 11, wherein said sealing element includes a spring element disposed within said open end that is operative to bias said lip portion toward said other of said damper housing and said third wall portion.

13. A gas spring and damper assembly comprising:
    a damper including a damper housing and a damper rod operatively connected with said damper housing for relative reciprocal motion therebetween;
    a gas spring including:
        a first end member supported along said damper rod;
        a second end member disposed in longitudinally-spaced relation to said first end member and extending longitudinally along at least a portion of said damper housing, said second end member including a side wall having an outer surface and extending longitudinally between opposing first and second ends, said side wall including a first section disposed toward said first end and a second section disposed toward said second end, said first section being spaced radially-outwardly from said damper housing such that said first end is unsupported by said damper housing and such that a fixed volume is defined between said damper housing and said side wall with an opening formed between said damper housing and said side wall along said first end; and,
        a flexible wall secured between said first and second end members such that a rolling lobe is formed along said outer surface of said side wall and such that a spring chamber is at least partially defined between said first and second end members and operative to receive a quantity of pressurized gas, said spring chamber including a first volume defined at least in part by said first end member and said flexible wall and said spring chamber including said fixed volume with said first volume and said fixed volume being in open and substantially-complete fluid communication through said opening;

a friction-reducing element operatively connected between said damper housing and said second section of said side wall of said second end member such that said damper housing and said second end member are freely rotatable relative to one another; and, a sealing element operatively disposed between said damper housing and said second section of said side wall such that a substantially fluid-tight seal is formed therebetween, said sealing member being positioned longitudinally-inwardly from said friction-reducing element such that said sealing element is longitudinally supported by at least a portion of said friction-reducing element and said quantity of pressurized gas within said spring chamber urges said sealing element toward said friction-reducing element.

14. A gas spring and damper assembly according to claim 13, wherein said second section of said side wall includes a first wall portion having a first cross-sectional dimension and a second wall portion having a second cross-sectional dimension that is greater than said first cross-sectional dimension of said first wall portion.

15. A gas spring and damper assembly according to claim 14, wherein said first wall portion is dispose longitudinally-inwardly of said second wall portion, and said second section includes a third wall portion extending radially-outwardly from said first wall portion to said second wall portion such that a shoulder is at least partially defined by said third wall portion.

16. A gas spring and damper assembly according to claim 13, wherein said friction-reducing element includes an inner bearing component supported on said damper housing, an outer bearing component operatively connected to said second section of said side wall and a plurality of rotating elements operatively connected between said inner and outer bearing components.

17. A gas spring and damper assembly according to claim 16 further comprising a support element disposed between said friction-reducing element and said sealing element, said support element including a first surface abuttingly engaging said sealing element and an opposing second surface abuttingly engaging said inner bearing component.

18. A gas spring and damper assembly according to claim 13, wherein said sealing element includes an inner side wall disposed adjacent said damper housing, an outer side wall disposed adjacent said second section of said side wall and an open end at least partially defined by said inner and outer side walls, said sealing element oriented relative to said damper housing and said second end member such that said open end is in fluid communication with said quantity of pressurized gas in said spring chamber.

19. A gas spring and damper assembly according to claim 13, wherein said first and second sections each have an outermost cross-sectional dimension, and said side wall includes a third section disposed between said first and second sections, said third section having an outermost cross-sectional dimension that is greater than said outermost cross-sectional dimensions of said first and second sections.

* * * * *